US012058538B2

(12) United States Patent
Tenny et al.

(10) Patent No.: US 12,058,538 B2
(45) Date of Patent: Aug. 6, 2024

(54) METHOD AND APPARATUS FOR COMMUNICATION

(71) Applicant: MediaTek Singapore Pte. Ltd., Singapore (SG)

(72) Inventors: Nathan Edward Tenny, San Jose, CA (US); Tao Chen, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 385 days.

(21) Appl. No.: 17/424,019

(22) PCT Filed: Mar. 24, 2020

(86) PCT No.: PCT/CN2020/080809
§ 371 (c)(1),
(2) Date: Jul. 19, 2021

(87) PCT Pub. No.: WO2020/192640
PCT Pub. Date: Oct. 1, 2020

(65) Prior Publication Data
US 2022/0104035 A1    Mar. 31, 2022

(30) Foreign Application Priority Data

Mar. 28, 2019 (WO) ................ PCT/CN2019/080203

(51) Int. Cl.
*H04W 24/04* (2009.01)
*H04W 76/14* (2018.01)
*H04W 76/28* (2018.01)

(52) U.S. Cl.
CPC .......... *H04W 24/04* (2013.01); *H04W 76/14* (2018.02); *H04W 76/28* (2018.02)

(58) Field of Classification Search
CPC ...... H04W 24/04; H04W 76/28; H04W 76/14
See application file for complete search history.

(56) References Cited

U.S. PATENT DOCUMENTS

| 10,356,738 B2* | 7/2019 | Lee ........................ H04W 92/18 |
| 11,337,126 B2* | 5/2022 | Tseng .................... H04W 76/27 |
| 2014/0286176 A1 | 9/2014 | Ro et al. |
| 2018/0124674 A1 | 5/2018 | Vutukuri et al. |

(Continued)

OTHER PUBLICATIONS

International Search Report and Written Opinion issued May 27, 2020 in PCT/CN2020/080809 filed Mar. 24, 2020.

(Continued)

*Primary Examiner* — Chandrahas B Patel

(57) ABSTRACT

An apparatus includes transmitting circuitry for transmitting radio signals, receiving circuitry for receiving radio signals and processing circuitry. The processing circuitry is configured to generate data to be transmitted to another apparatus via a first radio link without passing through a base station. The first radio link has a first direction from the apparatus to the other apparatus. Then, the processing circuitry determines a first monitoring configuration associated with the first radio link in the first direction. Then, the transmitting circuitry transmits the data to the other apparatus via the first radio link in the first direction with the first radio link being monitored based on the first monitoring configuration.

18 Claims, 7 Drawing Sheets

(56) References Cited

U.S. PATENT DOCUMENTS

2022/0353654 A1* 11/2022 Kang .................. H04W 76/27

OTHER PUBLICATIONS

Taiwan Office Action issued Nov. 26, 2020 in Taiwanese Patent Application No. 109109951 filed Mar. 25, 2020.
3GPP TR 38.885 V1.1.0, 3rd Generation Partnership Project; Technical Specification Group Radio Access Network; NR; Study on Vehicle-to-Everything, (Release 16), 2019, 111 total pages.
"RLM/RLF and RRM for NR V2X", InterDigital Inc., 3GPP RAN WG2 Meeting #105, R2-1901579, Athens, Greece, 2019, 4 total pages.
"Discussion on RLM and RLF for NR V2X", LG Electronics, 3GPP TSG-RAN WG2 Meeting #105, R2-1900914, Athens, Greece, 2019, 3 total pages.

* cited by examiner

METHOD AND APPARATUS FOR COMMUNICATION

INCORPORATION BY REFERENCE

This present disclosure claims the benefit of International Application No. PCT/CN2019/080203, "Link configuration and radio link management on a sidelink radio interface" filed on Mar. 28, 2019, which is incorporated herein by reference in its entirety.

TECHNICAL FIELD

The present disclosure describes embodiments generally related to radio link communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In some communications settings, such as public-safety communication (e.g., establishment of a communication network among emergency first responders), vehicle-to-everything (V2X) communication and the like, direct communication among mobile devices without depending on network infrastructure as an intermediary may be desirable. The direct communication among mobile devices can be referred to as sidelink communication, and the air interface between the mobile devices can be referred to as sidelink interface.

SUMMARY

Aspects of the disclosure provide methods and apparatuses for sidelink communication. For example, an apparatus includes transmitting circuitry for transmitting radio signals, receiving circuitry for receiving radio signals and processing circuitry. The processing circuitry is configured to generate data to be transmitted to another apparatus via a first radio link without passing through a base station. The first radio link has a first direction from the apparatus to the other apparatus. Then, the processing circuitry determines a first monitoring configuration associated with the first radio link in the first direction. The transmitting circuitry then transmits the data to the other apparatus via the first radio link in the first direction with the first radio link being monitored based on the first monitoring configuration.

In some embodiments, the transmitting circuitry can transmit a first message that carries the first monitoring configuration to cause the other apparatus to monitor the first radio link.

In some embodiments, the receiving circuitry receives a second message that carries a second monitoring configuration associated with a second radio link in a second direction from the other apparatus to the apparatus. The processing circuitry then monitors the second radio link based on the second monitoring configuration.

In some examples, the first message and the second message are messages of a sidelink radio resource control (RRC) protocol.

In some embodiments, the first monitoring configuration includes at least one of a configuration of reference signals, one or more timer values and one or more threshold values.

In some examples, the processing circuitry evaluates a reception of a control channel in the second radio link based on the second monitoring configuration.

In an embodiment, the processing circuitry can cause the apparatus to enter a discontinuous transmission (DTX) mode. Then, the transmitting circuitry can send an indicator to suspend the first monitoring configuration associated with the first radio link.

In some embodiments, the processing circuitry detects feedback signals in response to the transmission of the data, and compares a number of expected feedback signals with a number of detected feedback signals based on the first monitoring configuration.

In an embodiment, the processing circuitry detects at least one of an acknowledgement signal and a negative acknowledgement signal in response to the transmission of the data. The acknowledgement signal indicates a decoding success of the data, the negative acknowledgement signal indicates a decoding failure of the data.

In some examples, the processing circuitry declares a radio link failure of the first radio link when a ratio of the number of detected feedback signals to the number of expected feedback signals is below a threshold.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide techniques for configuring and managing radio links on sidelink interface between mobile devices. The sidelink interface can include directional links for communication between the mobile devices, and the directional links are configured and monitored independently of the other.

In some communication scenarios, such as public-safety communication (e.g. a communication network among emergency first responders), vehicle-to-everything (V2X) communication and the like, mobile devices can communicate directly with one another, without depending on network infrastructure as an intermediary. For example, the mobile devices can directly communicate without going through a base station. The direct communication among mobile devices can be referred to as sidelink communication, and the air interface (also referred to as radio interface in some examples) between the mobile devices can be referred to as sidelink interface. The sideline interface is also referred to as PC5 interface in some examples.

In some examples, while actual communication of data does not pass through the base station, the use of the sidelink interface, such as the use of sidelink radio resources and the like, may be wholly or partly controlled by a base station.

According to some aspects of the disclosure, operations on the sidelink interface may be connection-oriented. For example, two devices may mutually establish radio connections for communication. The radio link connections may need to be monitored. According to the disclosure, radio link connections can be monitored based on respective radio link monitoring configurations.

Figure 1:
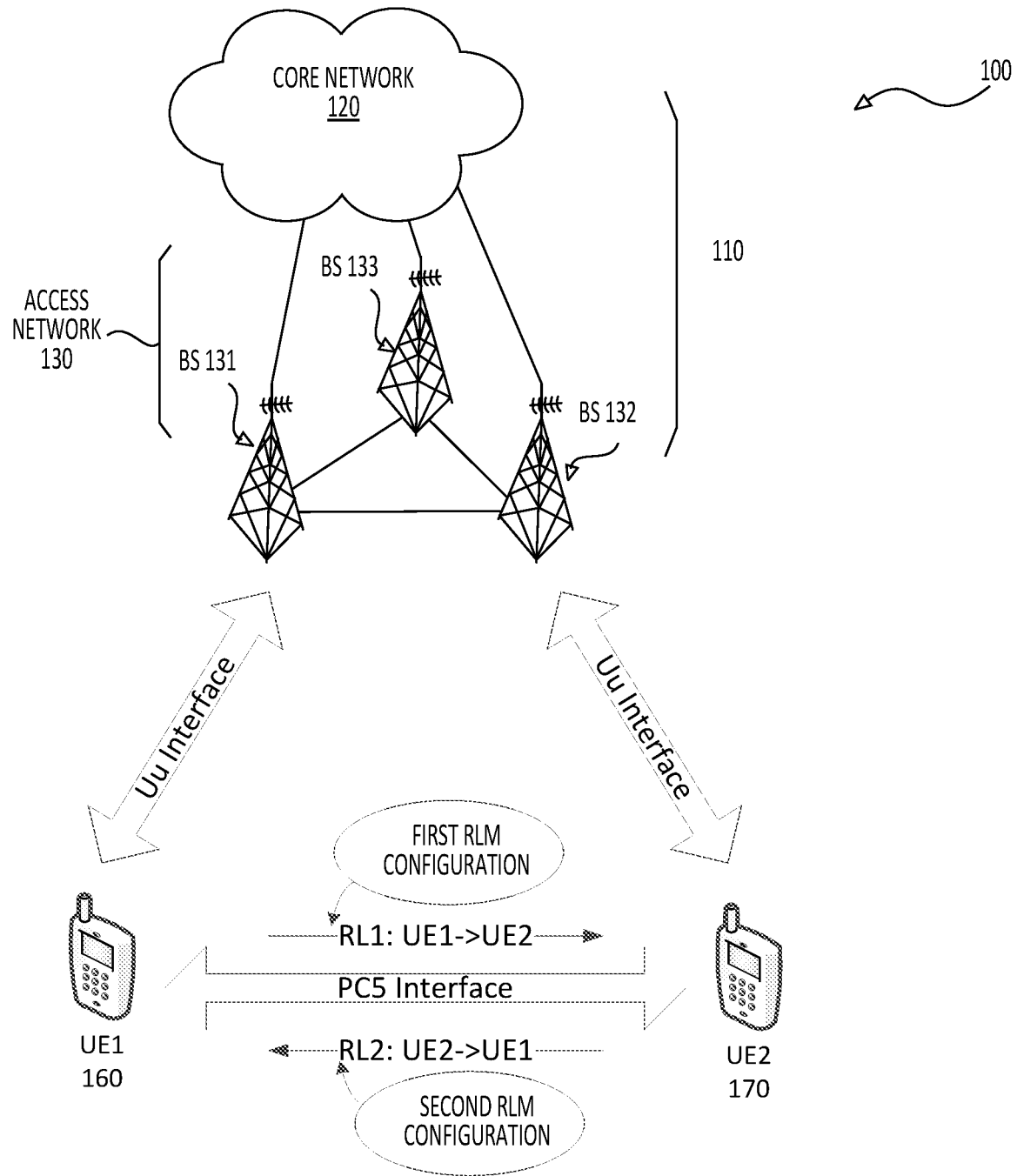
FIG. 1 shows a diagram of a wireless communication system according to some embodiments of the disclosure.

FIG. 1 shows a diagram of a wireless communication system 100 according to some embodiments of the disclosure. The wireless communication system 100 includes multiple mobile devices, such as UE1 160 and UE2 170, with sidelink interface being setup between the mobile devices to enable sidelink communication. The sidelink interface provides directional link connections for data transmission. The directional link connections are independently monitored.

Specifically, in the FIG. 1 example, the wireless communication system 100 includes a network system 110 that includes a core network 120 and an access network 130 coupled together. The network system 110 can be any suitable network system. In an example, the network system 110 is a 5G system (5GS) that is configured based on the new radio (NR) technology. Then, the core network 120 can be a 5G core (5GC) network and the access network 130 can be a next generation (NG) radio access network (NG-RAN) for air interface. The NG-RAN may use either NR or evolved universal terrestrial radio access (E-UTRA) radio technology, or a mix of both at different network nodes. It is noted that the wireless communication system 100 can include other suitable components, such as an application server system (not shown).

In another example, the network system 110 is an evolved packet system (EPS) that is configured based on LTE technology. Then, the core network 120 can be an evolved packet core (EPC) network and the access network 130 can be an evolved universal terrestrial radio access network (E-UTRAN) 130 for air interface. The E-UTRAN may use E-UTRA radio technology.

In another example, the network system 110 is implemented using a mix of LTE technology and NR technology. For example, the network system 110 includes a first sub-system (not shown) based on LTE technology and a second sub-system (not shown) based on the NR technology. The two sub-systems are suitably coupled together.

The access network 130 includes one or more base stations that air-interface with mobile devices, such as user equipment and the like, using suitable technology and can provide control plane and user plane to the mobile devices. The base stations in the access network 130 are generally fixed stations that communicate with the user equipment and can also be referred to using other suitable terminology, such as evolved Node-B (eNB), a next generation Node-B (gNB), a base transceiver system, an access point and the like.

In the FIG. 1 example, the network system 110 provides wireless communication service to the mobile devices, such as UE1 160, UE2 170, and other devices that are not shown, via radio interfaces that can be referred to as Uu interfaces in some examples. A radio interface between two entities includes radio resources that are used to exchange signals between the two entities. For example, UE1 160 can transmit signals to and/or receive signals from the network system 110 via a Uu interface between the network system 110 and the UE1 160; and UE2 170 can transmit signals to and/or receive signals from the network system 110 via a Uu interface between the network system 110 and UE2 170.

Generally, a Uu interface between the network system 110 and a UE (such as UE1 160 or UE2 170) is a bidirectional link connection. For example, the UE can transmit data and receive data from the network system 110 via the bidirectional link connection; and the network system 110 can transmit and receive data from the network system 110 via the bidirectional link connection.

In an example, for the bidirectional link connection between a mobile device and the network system 110, the mobile device is instructed to monitor signals from the network system 110 to determine whether synchronization is maintained, and declare a radio link failure if synchronization is lost. Generally, signals from the mobile device to the network system 110 are not monitored for synchronization. For example, UE1 160 monitors the signals from the network system 110 to UE1 160 and UE2 170 monitors the signals from the network system 110 to UE2 170. Generally, the network system 110 does not monitor the signals from UE1 160 to the network system 110 and does not monitor the signals from the UE2 170 to the network system 110.

Further, in the FIG. 1 example, a radio interface, that is referred to as a sidelink interface (also referred to as PC5 interface), can be setup between UE1 160 and UE2 170, and the UE1 160 and UE2 170 can perform communication directly via the sidelink interface without going through a base station.

The UE1 160 and UE2 170 can be any suitable device respectively, such as a vehicle with embedded wireless communication component, a bicycle with embedded wireless communication component, a street light with embedded wireless communication component, a sign with embedded wireless communication component, a cell phone, a smart phone, a smart watch, a wearable device, a tablet computer, a laptop computer, and the like. The direct communication between the UE1 160 and UE2 170 in the wireless communication network 100 can be referred to as sidelink communication. The sidelink communication can be vehicle to vehicle (V2V) communication, vehicle to pedestrian (V2P) communication, vehicle to device (V2D) communication, user equipment to user equipment communication, cell phone to cell phone communication, device to device (D2D) wireless communication, and the like.

The sidelink interface provides radio resources for two directional radio links, such a first directional radio link (RL1) for data transmission from UE1 160 to UE2 170 and a second directional link (RL2) for data transmission from UE2 170 to UE1 160. In some examples, the directional radio links may be combined together for bidirectional communication. In some other cases, one directional radio link may be used while the other directional radio link is not used, or used only for feedback transmissions.

Aspects of the disclosure provide techniques to monitor a directional radio link based on a radio link monitoring (RLM) configuration associated with the directional radio link. Thus, directional radio links between two mobile devices can be individually monitored based on respective radio link monitoring configurations.

According to some aspects of the disclosure, a directional radio link can be monitored by various monitoring techniques and each monitoring technique includes various configuration parameters. In an example, a UE, such as UE1 160, UE2 170, and the like transmits reference signals whether the UE is at a transmitting side for data transmission or at a receiving side for data transmission. The reference signals can be monitored by a peer UE in communication as a means for radio link monitoring. In another example, a UE, such as UE1 160, UE2 170, and the like transmits a control channel whether the UE is at a transmitting side for data transmission or at a receiving side for data transmission. The peer UE in communication may monitor the reliability of the control channel for radio link monitoring.

Specifically, in some examples, a UE that performs radio link monitoring is implemented according to a protocol stack. The protocol stack includes a physical layer and upper layers of the physical layers. The physical layer can generate indications that are indicative of quality of the monitoring subject, such as the received reference signals, the received control channel, and the like. Then, the indications can be provided to the upper layers in the UE, and the upper layers can process the indications and determine the status of the radio link.

In an example, a monitoring and judgement technique is implemented as a radio link monitoring (RLM) procedure in a radio resource control (RRC) layer of the protocol stack. The RRC layer receives indications that are generated from lower layers, such as regular in-sync/out-of-sync (IS/OOS) indications based on monitoring of signals for the radio link, such as a scheduling channel, synchronization signals, reference signals, a control channel and the like. In some embodiments, the RLM procedure does not depend on which specific signals are monitored, only on the generation of the IS/OOS indications. For example, when the number of OOS indications is larger than a first threshold number, a timer is started and the number of in-sync (IS) indications that are received is counted. When the timer expires, and the number of in-sync (IS) indications is below a second threshold number, the UE determines that the radio link has a radio link failure (RLF) and can declare RLF for the radio link. It is noted that the IS and OOS indications may be counted according to various conventions. For example, the timer may be started based on a number of consecutive OOS indications, a total number of OOS indications received within a time window, and the like.

In some embodiments, a directional radio link can be monitored from a transmitting side of the data transmission, and the monitoring techniques used at the transmitting side will be described in detail with reference to FIG. 5 and FIG. 6. In other embodiments, a directional radio link can be monitored from a receiving side of the data transmission, and the monitoring techniques used at the receiving side will be described in detail with reference to FIGS. 2-4.

According to an aspect of the disclosure, each of the directional radio links between mobile devices has respective radio link monitoring configuration. In the FIG. 1 example, RL1 is monitored according to a first RLM configuration, and RL2 is monitored according to a second RLM configuration. The first RLM configuration and the second RLM configuration can be the same or can be different.

According to an aspect of the disclosure, a RLM configuration can include various monitoring parameters. In an example, the RLM configuration includes parameters to indicate whether to perform RLM at transmitting side, or receiving side, or both the transmitting side and the receiving side of the data communication. In another example, a RLM configuration includes specific time durations for monitoring, and includes threshold values that are used for example to determine radio link failure.

According to some aspects of the disclosure, the RLM configuration may depend on network configuration, pre-configuration at UE or control signaling between UEs. In some examples, UE1 160 is transmitting the traffic (periodically), and monitoring based on the feedback signals. Then, UE1 160 may indicate that RLM can be only performed at UE1 in the signaling (e.g., connection setup, or RLM configuration) to UE2 170. The connection between UE1 160 and UE2 170 may be configured by control signaling, e.g. of a PC5-RRC protocol, network configuration or pre-configuration at UEs.

In an example, each UE may transmit reference signals, either throughout the connection (whether the UE functions as a transmitter, a receiver, or both) or only when the UE has data to transmit; these reference signals may be monitored by the peer UE as a means of radio link monitoring (RLM). In another example, each UE may transmit a control channel (e.g. a physical sidelink control channel (PSCCH)), and the peer UE may monitor the reliability of the control channel for RLM. In according to an aspect of the disclosure, the configuration of the connection includes an RLM configuration. The RLM configuration can include a configuration of reference signals, a configuration of a control channel, values for one or more timers, values for one or more thresholds, and so on. For example, an RLM configuration may include a threshold number of out-of-sync indications that will trigger radio link problem detection, and a value of a timer whose expiry triggers radio link failure (RLF). In another example, an RLM configuration may include a configuration of reference signals to be monitored by the receiving UE, or other combinations of parameters, such as the expected (periodical) feedbacks, channel quality indicator (CQI) reports, rank indicator (RI) reports, precoding matrix indicator (PMI) reports, (periodical) data, and/or data demodulation reference signal (DMRS) transmission.

Figure 2:
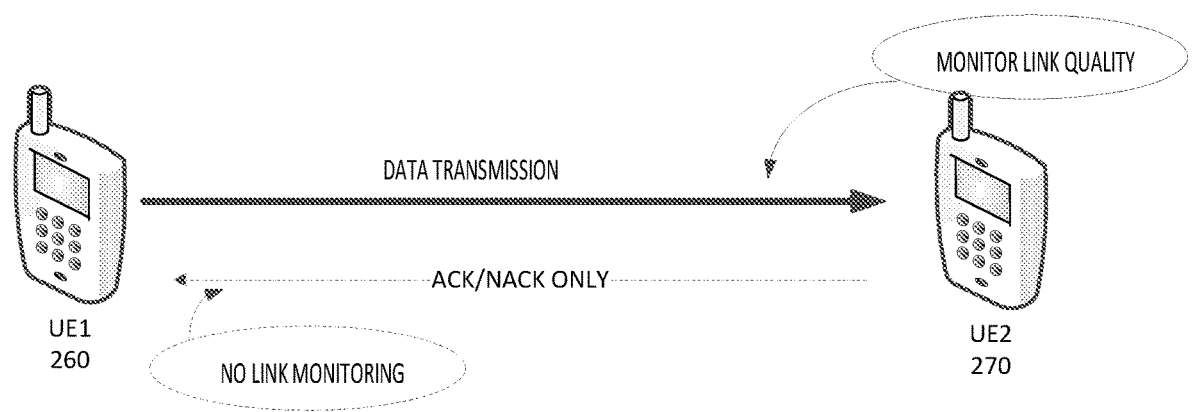
FIG. 2 shows an example for sidelink monitoring according to some embodiments of the disclosure.

FIG. 2 shows an example for sidelink monitoring according to some embodiments of the disclosure. In the FIG. 2 example, two UEs, shown by UE1 260 and UE2 270, perform data transmission via a directional radio link from UE1 260 to UE2 270. In an example, the UE1 260 can be UE1 160 in FIG. 1; and UE2 270 can be UE2 160 in FIG. 1.

In an embodiment, UE1 260 is a wireless device in a first vehicle, and UE2 260 is a wireless device in a second vehicle. In a scenario, the UE1 260 transmits data (for instance, a vehicle may perform sharing of information detected from sensors of the first vehicle) to other UEs, such as UE2 270. UE2 does not need to transmit data to UE1 260 in an example. In the FIG. 2 example, UE2 270 may or may not transmit confirmation signals, such as acknowledgement (ACK) signal or negative acknowledgement (NACK) signal, to indicate reception success and/or reception failure of UE1's transmissions. In the FIG. 2 example, UE2 270 monitors the link quality of the directional radio link from UE1 260 to UE2 270, but UE1 260 may not need to monitor the directional radio link from UE2 270 to UE1 260.

Figure 3:
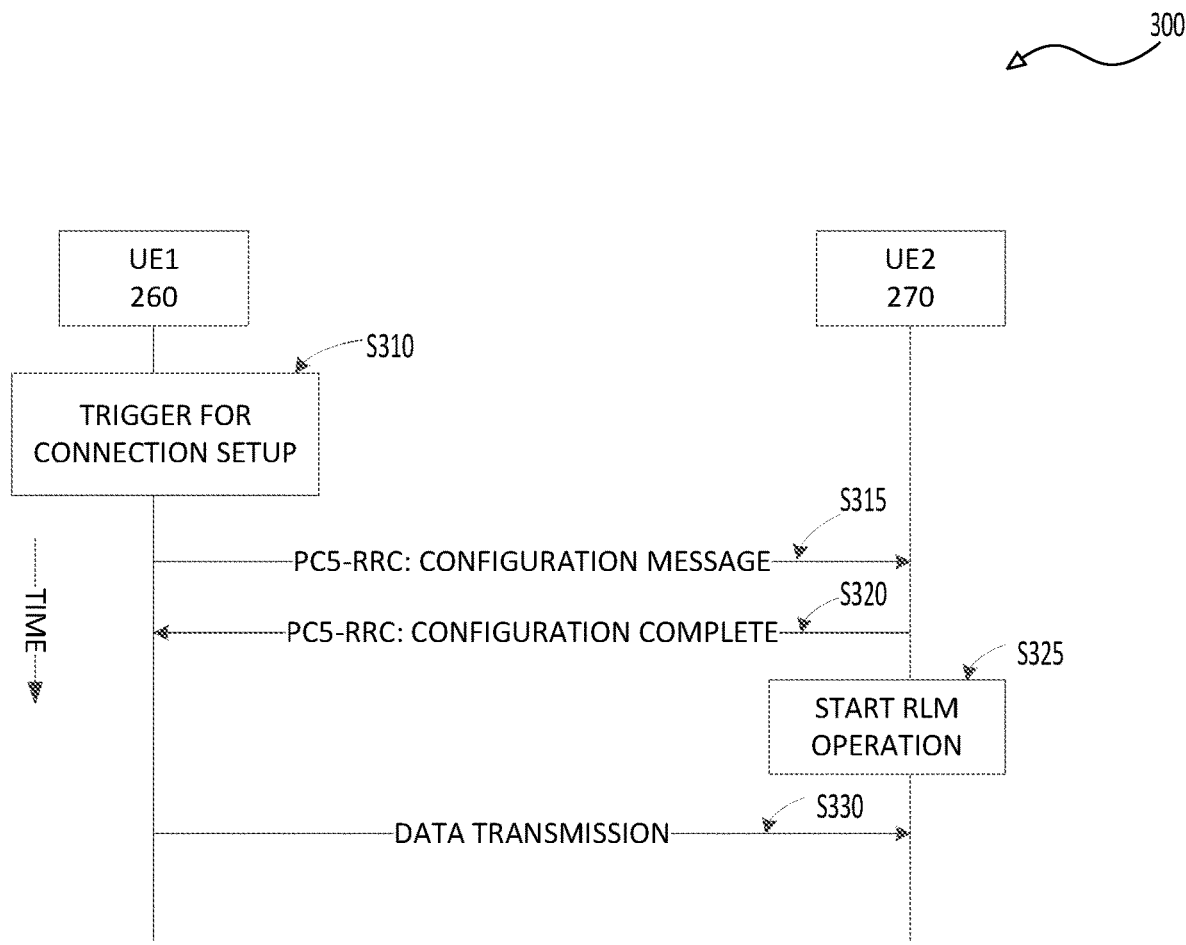
FIG. 3 shows an example of a process for operations in a sidelink communication according to some embodiments of the disclosure.

FIG. 3 shows an example of a process 300 for operations in a sidelink communication according to some embodiments of the disclosure. The process 300 can be executed by UE1 260 and UE2 270 in FIG. 2. In the FIG. 3 example, data traffic is carried out in one direction from UE1 260 to UE2 270, and the configuration takes place in one direction as well. The process starts at S310.

At S310, UE1 260 has data available to share, and the availability of traffic triggers UE1 260 to set up a connection, such as a directional radio link from UE1 260 to UE2 270.

At S315, UE1 260 sends a configuration message to UE2 270. The configuration message includes information on the radio link monitoring (RLM) configuration associated with the directional radio link from UE1 260 to UE2 270, such as an instruction to the UE2 270 to perform RLM, a threshold number of out-of-sync indications that will trigger radio link problem detection, a value of a timer whose expiry triggers radio link failure (RLF), and the like.

At S320, the UE2 270 receives the configuration message, and configures according to the configuration message. Further, in response to the configuration message, UE2 270 sends a configuration complete message to UE1 260.

At S325, the UE2 270 starts RLM operation according to the RLM configuration. It is noted that the configuration message may include configurations for other aspects of the connection, and the UE2 270 may operate according to the configurations for other aspects of the connection.

At S330, UE1 260 then transmits data to UE2 270, and may continue to do so as long as UE2 270 can receive the data successfully, in other words, while the radio link is in good condition.

In the FIG. 3 example, when the radio link condition deteriorates to the point of causing RLF, UE2 270 may take various actions, such as reporting the failure to upper layers of a protocol stack, attempting to re-establish the connection, etc.

It is noted that, in some examples, traffic may need to be carried out in the opposite direction.

Figure 4:
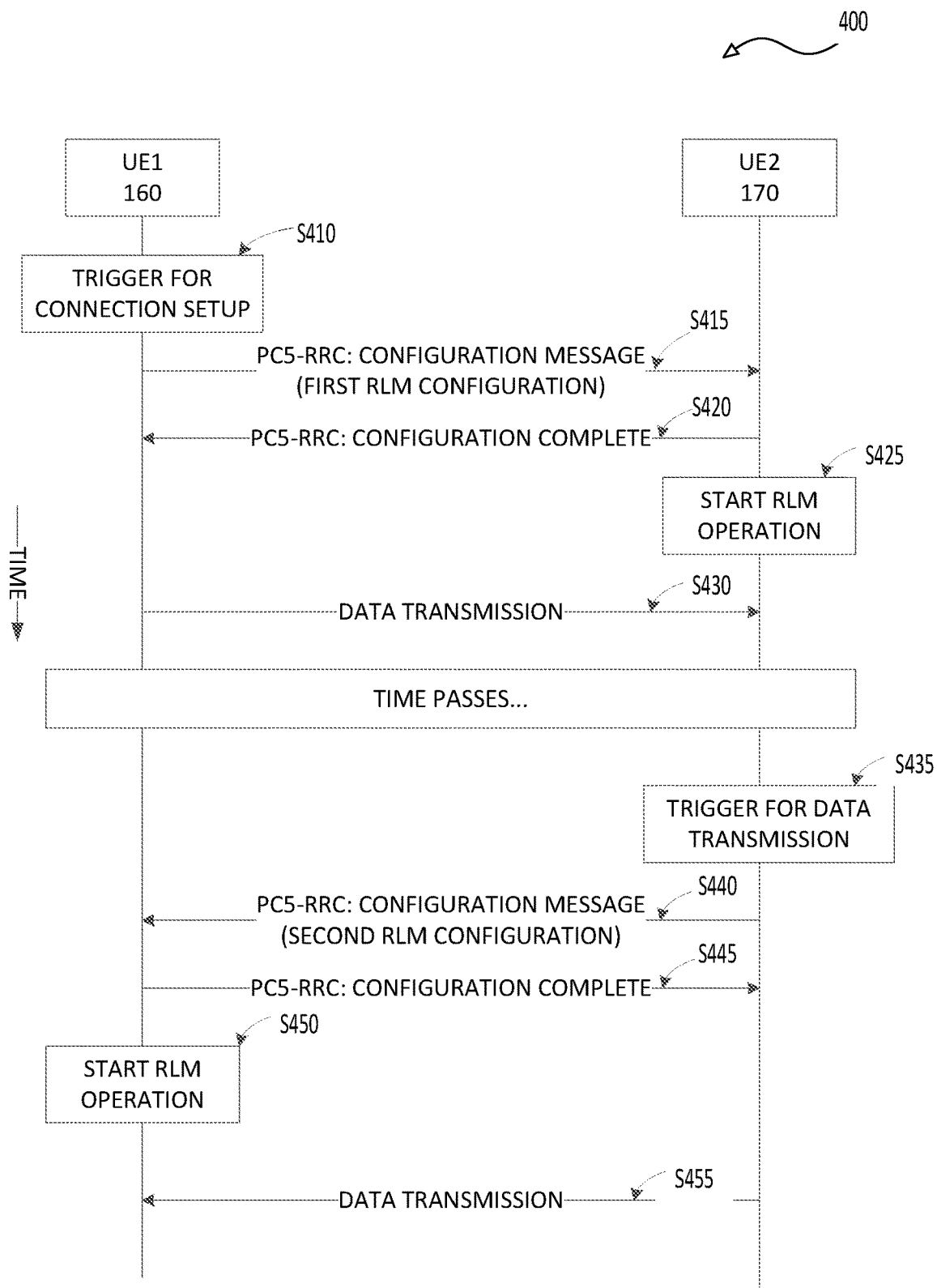
FIG. 4 shows an example of a process for operations in a sidelink communication according to some embodiments of the disclosure.

FIG. 4 shows an example of a process 400 for operations in a sidelink communication according to some embodiments of the disclosure. The process 400 can be executed by UE1 160 and UE2 170 in FIG. 1. In the FIG. 4 example, data traffic is carried out in one direction from UE1 160 to UE2 170, and after a while data traffic is carried out in the other direction from UE2 170 to UE1 160. The process starts at S410.

At S410, UE1 160 has data available to share, and the availability of traffic triggers UE1 160 to set up a connection, such as a directional radio link from UE1 160 to UE2 170.

At S415, UE1 160 sends a configuration message to UE2 170. The configuration message includes information on a first RLM configuration associated with the directional radio link from UE1 160 to UE2 170 (e.g., first RLM configuration in FIG. 1). The information on the first RLM configuration can include an instruction to the UE2 170 to perform RLM on the directional radio link from UE1 160 to UE2 170, a threshold number of out-of-sync indications that will trigger radio link problem detection, a value of a timer whose expiry triggers radio link failure (RLF), and the like.

At S420, the UE2 170 receives the configuration message, and configures according to the configuration message. Further, in response to the configuration message, UE2 170 sends a configuration complete message to UE1 160.

At S425, UE2 170 starts RLM operation according to the first RLM configuration. It is noted that the configuration message may include configurations for other aspects of the connection, and the UE2 170 may operation according to the configurations for other aspects of the connection.

At S430, UE1 160 then transmits data to UE2 170, and may continue to do so as long as UE2 170 can receive the data successfully, in other words, while the radio link is in good condition.

At S435, after some time, UE2 170 has data available to share, and will trigger the following operations. In an example, the directional radio link from UE2 170 to UE1 160 is setup at the same time when the directional radio link from UE1 160 to UE2 170. In another example, the directional radio link from UE2 170 to UE1 160 is setup when data to share is available at the UE2 170.

At S440, UE2 170 sends a configuration message to UE1 160. The configuration message includes information on a second RLM configuration associated with the directional radio link from UE2 170 to UE1 160 (e.g., second RLM configuration in FIG. 1). The information on the second RLM configuration can include an instruction to the UE2 170 to perform RLM on the directional radio link from UE2 170 to UE1 160, a threshold number of out-of-sync indications that will trigger radio link problem detection, a value of a timer whose expiry triggers radio link failure (RLF), and the like.

At S445, the UE1 160 receives the configuration message, and configures according to the configuration message. Further, in response to the configuration message, UE1 160 sends a configuration complete message to UE2 170.

At S450, the UE1 160 starts RLM operation according to the second RLM configuration. It is noted that the configuration message may include configurations for other aspects of the connection, and the UE1 160 may operation according to the configurations for other aspects of the connection.

At S455, UE2 170 then transmits data to UE1 160, and may continue to do so as long as UE1 160 can receive the data successfully, in other words, while the radio link is in good condition.

The process 400 shown in FIG. 4 is "asynchronous" in the sense that the RLM configuration for a given direction of the connection is delivered only when the RLM configuration is needed. For example, UE1 160 sends the first RLM configuration to UE2 170 at the beginning of the connection (since the connection was established due to the need for UE1 160 to transmit data to UE2 170), but UE2 170 sends the second RLM configuration to UE1 160 only later, when a trigger causes UE2 170 to transmit data to UE1 160. In case of the bidirectional connection, it is possible to enable or disable RLM at one side, e.g., depending on the activities of the traffic in one direction. For example, when there is no traffic transmitted from UE1 160 for some time while there is still traffic to be transmitted from UE2 170, RLM at UE2 can be disabled whereas RLM at UE1 160 can be kept.

In some embodiments, UE1 160 may enter sidelink discontinuous transmission (DTX) mode. In the sidelink DTX mode, the UE1 160 can repetitively be transmission-active and transmission-inactive according to a cycle. Each cycle includes an active time duration and an inactive time duration. In the active time duration, the UE1 160 is transmission-active and can transmit data when data to share is available. In the inactive time duration, the UE1 160 is transmission-inactive (e.g., transmitting circuitry is in a low power mode) and does not transmit data, but may still transmit feedback signals in response to reception of data from the UE2 170. Then, in an example, the UE1 160 enables/requires RLM at UE2 170 only in the active time duration for the sidelink DTX of UE1 160. During the inactive time duration for the sidelink DTX mode of UE1 160, the feedback information may be still transmitted by UE1 160 (such as acknowledgement signals and negative acknowledgement signals responsive to data transmissions from UE2 170) to facilitate the UE2 170 data transmission. However, data transmission from UE1 160 is restricted to the active time duration for the sidelink DTX mode of UE1 160. Furthermore, such DTX mode can be applied for UE1 160 and UE2 170 separately/independently.

In some embodiments, when UE2 170 has no more traffic to transmit, and the UE1 160 is in the DTX mode, then UE2 170 can enter sidelink discontinuous reception (DRX) mode. In the sidelink DRX mode, the UE1 170 can repetitively be reception-active and reception-inactive according to a cycle. Each cycle includes an active time duration and an inactive time duration. In the active time duration, the UE1 170 is reception-active and can receive data. In the inactive time duration, the UE1 170 is reception-inactive (e.g., receiving circuitry is in a low power mode) and does not receive data. In some examples, such DRX mode configuration for UE2 170 can be aligned with DTX mode configuration for UE1 160. During DRX mode, RLM is only performed during the active time duration of DRX mode. It is noted that applying DTX and/or DRX operation jointly or independently can maintain the sidelink with low complexity and low power consumption for RLM while reducing the latency for resuming data transmission.

According to an aspect of the disclosure, for uni-directional radio link connection, such as the scenario in FIG. 3, the RLM can be disabled along with the release of the uni-directional radio link connection, e.g., in case of no traffic at UE1 260. In some embodiments, UE1 260 can enter sidelink DTX mode, and the UE2 260 can enter sidelink DRX mode when data to share is not available temporally. Thus, when data to share becomes available at UE1 260 again, data transmission can be resumed with low latency.

According to another aspect of the disclosure, for uni-directional radio link connection, such as the scenario in FIG. 2, the uni-directional radio link for data transmission from UE1 260 to UE2 270 has been established whereas radio link for data transmission from UE2 270 to UE1 260 has not been established, then the fast link setup for data transmission from UE2 270 to UE1 260 on top of the existing uni-directional radio link connection (UE1→UE2 link) can be performed. In an example, UE2 270 may send the link setup request indicator associated with feedback signals, such as HARQ A/N, channel state information (CSI) reports, etc. for fast link setup. Further, UE2 270 may send, for example, link and RLM configuration to UE1 260 for link setup and maintenance.

As shown in FIG. 4, the configuration message and the configuration complete message may belong to a PC5-RRC protocol. As in FIG. 3, the configuration messages of FIG. 4 may contain various parameters related to the RLM configuration, as well as other parameters related to other aspects of the connection.

According to some aspects of the disclosure, the transmitter side can also perform radio link monitoring.

Figure 5:
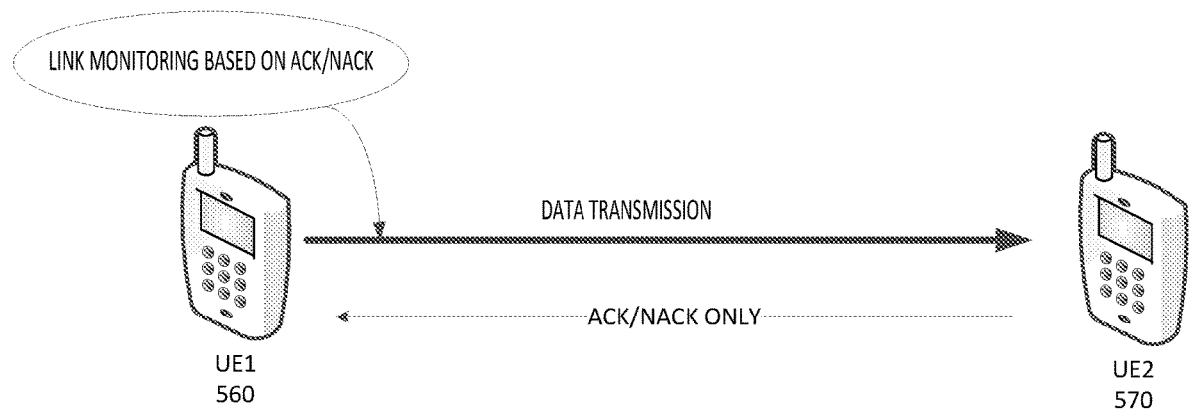
FIG. 5 shows an example for uni-directional radio link according to some embodiments of the disclosure.

FIG. 5 shows an example for uni-directional radio link according to some embodiments of the disclosure. The uni-directional radio link is for data transmission from UE1 560 to UE2 570. In an example, the UE1 560 is configured as the UE1 160 in FIG. 1; and UE2 570 is configured as the UE2 170 in FIG. 1. In an example, UE1 560 is a wireless device in a first vehicle, and UE2 570 is a wireless device in a second vehicle. In a scenario, the UE1 560 transmits data (for instance, a vehicle may perform sharing of information detected from sensors of the first vehicle) to other UEs, such as UE2 570, who do not need to transmit data to UE1 560. In the FIG. 5 example, UE2 570 transmits feedback signals, such as acknowledgement (ACK) signal or negative acknowledgement (NACK) signal, to indicate reception success and/or reception failure of UE1's transmissions. In such uni-directional radio link cases, UE1 570 may need to monitor the link quality of the uni-directional radio link from UE1 560 to UE2 570 based on the feedback signals.

Figure 6:
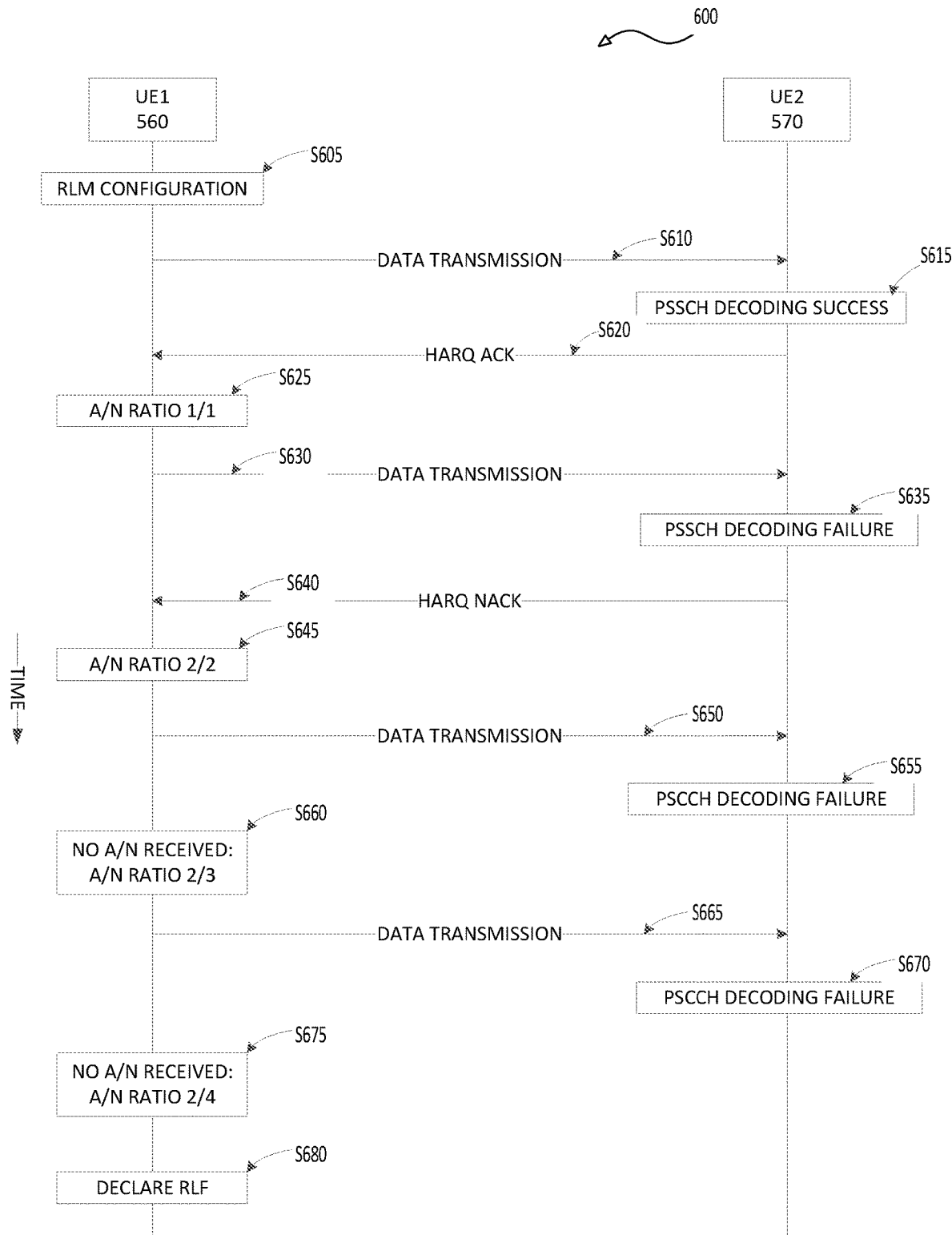
FIG. 6 shows an example of a process for operations in a sidelink communication according to some embodiments of the disclosure.

FIG. 6 shows an example of a process 600 for operations in a sidelink communication according to some embodiments of the disclosure. The process 600 can be executed by UE1 560 and UE2 570 in FIG. 5. In the FIG. 6 example, data traffic is carried out in one direction from UE1 560 to UE2 570, and the radio link monitoring is performed at the transmitting side by UE1 560 based on feedback signals. In some embodiments, the sidelink communication can include a control channel and a data channel in the physical layer. The control channel is referred to as physical sidelink control channel (PSCCH) and is used to carry sidelink control information, such as destination identification, resource assignment, modulation and coding scheme and the like. The data channel is referred to as physical sidelink shared channel (PSSCH), and carries data according to the sidelink control information.

Generally, for data transmission, at the data transmitting side, the corresponding PSCCH for a given PSSCH is sent before the PSSCH data. At the data receiving side, the sidelink control information is detected from PSCCH, and the sidelink control information is used to demodulate and decode the data in the PSSCH. In some embodiments, feedback techniques, such as automatic repeat request (ARQ), hybrid automatic repeat request (HARQ) technique, and the like can be used. Using HARQ technique as an example, when the received data is successfully decoded, the data receiving side sends an acknowledgment signal (HARQ ACK) to the data transmitting side; when the received data cannot be successfully decoded, the data receiving side sends a negative acknowledgement signal (HARQ NACK) to the data transmitting side which may trigger a retransmission.

Specifically, in the FIG. 6 example, the UE1 560 can monitor the quality of the sidelink communication from UE1 560 to UE2 570 based on the feedback signals from UE2 570. In the FIG. 6 example, the UE1 560 performs multiple data transmissions to UE2 570. For each data transmission, the UE1 560 expects a feedback signal. The UE1 560 can calculate a ratio of a received number of feedback signals to an expected number of feedback signals, and determine the quality of the sidelink communication based on the ratio. The feedback signals include acknowledgement signals and negative acknowledgement signals, and are labeled as A/N in FIG. 6. For example, the process starts at S605.

At S605, a RLM configuration associated with a uni-directional radio link for data transmission from UE1 560 to UE2 570 is obtained by the UE1 560. In an example, the UE1 determines the RLM configuration. In another example, the RLM configuration is pre-configured and stored in a memory of the UE1 560. In another example, the RLM configuration is provided from a network system, such as the network system 110, to the UE1 560. The RLM configuration includes information regarding who will perform the RLM, what is the threshold to determine radio link failure, what is the time duration after transmission to receive feedback signal, and the like. For example, the RLM configuration identifies UE1 560 to perform the RLM and specifies 50% as the threshold for determining radio link failure. In an embodiment, the UE1 560 can include an indicator in a control channel, such as PSCCH, to claim the responsibility to perform RLM.

At S610, the UE1 560 performs a first data transmission to the UE2 570. The first data transmission can include PSCCH carrying sidelink control information and PSSCH carrying the data. At this time, UE1 560 then determines the number of expected feedback signals for total data transmission is 1. In an example, the PSCCH may also include the indicator indicating that RLM is performed at the data transmitting side.

At S615, UE2 570 successfully decodes the PSCCH to obtain the sidelink control information. Based on the sidelink control information, the UE2 570 successfully decodes the PSSCH. In an example, UE2 570 determines that the data transmitting side will perform RLM, and UE2 570 is required to send feedback signals in response to data reception. In another example, UE2 570 is configured to send feedback signals in response to data reception, without an explicit indication that these feedback signals will be used for RLM.

At S620, UE2 570 sends a feedback signal (HARQ ACK) to indicate a success of data reception and decoding.

At S625, the UE1 560 receives the feedback signal, determines a total number of received feedback signals, and calculates a ratio (referred to as A/N ratio) of the number of received feedback signals to the number of expected feedback signal. For example, the A/N ratio is 1/1 at S625.

At S630, the UE1 560 performs a second data transmission to the UE2 570. The second data transmission can include PSCCH carrying sidelink control information corresponding to the second data transmission and PSSCH carrying the data for the second data transmission. The UE1 560 then determines that the number of expected feedback signals for total data transmission is 2.

At S635, UE2 570 successfully decodes the PSCCH, but does not successfully decode the PSSCH. Such a decoding failure may be due to deteriorating channel conditions, a localized burst of interference, etc.

At S640, UE2 570 sends a feedback signal (HARQ NACK) to indicate a control channel reception but data decoding failure.

At S645, the UE1 560 receives the feedback signal, determines the total number of received feedback signals is 2, and calculates A/N ratio. The A/N ratio is 2/2 at S645.

At S650, the UE1 560 performs a third data transmission to the UE2 570. The third data transmission can include PSCCH carrying sidelink control information corresponding to the third data transmission and PSSCH carrying the data for the third data transmission. The UE1 560 then determines that the number of expected feedback signals for total data transmission is 3.

At S655, UE2 570 is not able to decode the PSCCH and thus does not know if the transmission was intended for UE2 570, so UE2 570 does not send a feedback signal.

At S660, UE1 560 expects a feedback signal, but does not receive one in response to the third data transmission, for example in a specific time duration. After determining that UE1 560 did not receive a feedback signal (for example, after the specific time duration), UE1 560 determines that the total number of received feedback signals is still 2. Then, the UE1 560 determines the A/N ratio. The A/N ratio is 2/3 at S660.

At S665, the UE1 560 performs a fourth data transmission to the UE2 570. The fourth data transmission can include PSCCH carrying sidelink control information corresponding to the fourth data transmission and PSSCH carrying the data for the fourth data transmission. The UE1 560 then determines that the number of expected feedback signals for total data transmission is 4.

At S670, UE2 570 is not able to decode the PSCCH and thus does not know if the transmission was intended for UE2 570, so UE2 570 does not send a feedback signal.

At S675, UE1 560 monitors for the feedback signal, does not receive one in response to the fourth data transmission for example in a specific time duration. On determining that UE1 560 did not receive a feedback signal, UE1 560 determines that the number of received feedback signals is still 2. Then, the UE1 560 determines the A/N ratio. The A/N ratio is 2/4 at S675.

At S680, the UE1 560 compares the A/N ratio to a threshold value for declaring radio link failure (RLF). For example, the threshold value is 50%, UE1 560 may declare RLF when 50% of the total transmissions do not receive an A/N response. In the FIG. 6 example, UE1 560 declares RLF on the uni-directional radio link for data transmission from UE1 560 to UE2 570.

Figure 7:
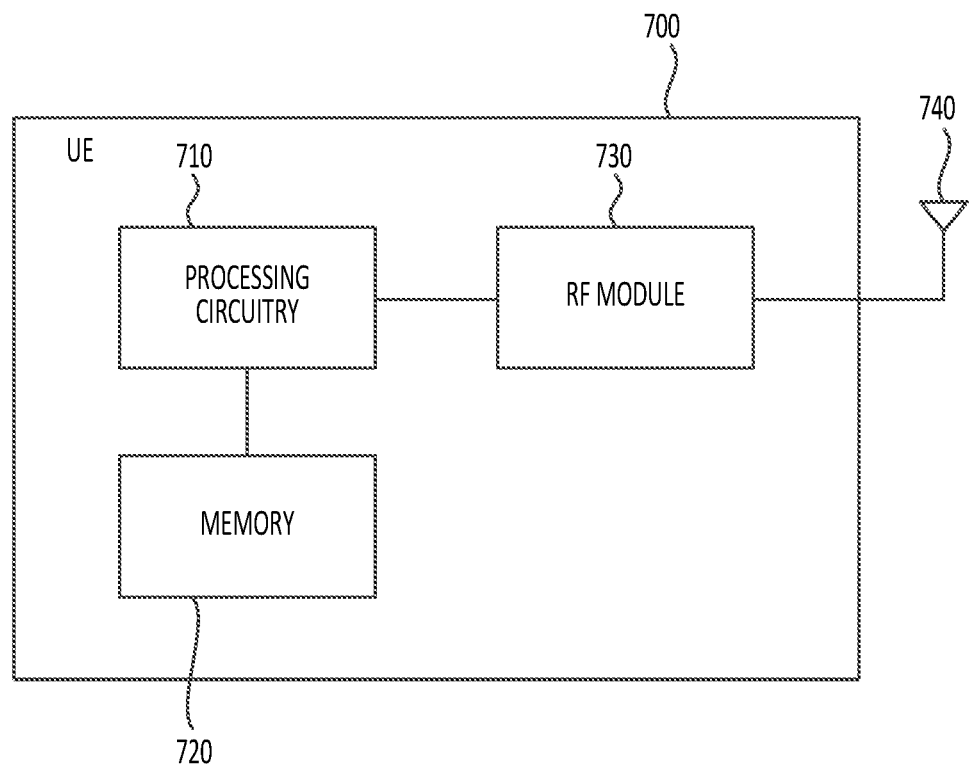
FIG. 7 shows a block diagram of a user equipment device according to embodiments of the disclosure.

FIG. 7 shows a block diagram of a UE 700 according to embodiments of the disclosure. In an example, the UE1 160, UE2 170, UE1 260, UE2 270, UE1 560 and UE2 570 can be configured in the same manner as the UE 700. The UE 700 can be configured to perform various functions in accordance with one or more embodiments or examples described herein. Thus, the UE 700 can provide means for implementation of techniques, processes, functions, components, systems described herein. For example, the UE 700 can be used to implement functions of UE1 160, UE2 170, UE1 260, UE2 270, UE1 560 and UE2 570 in various embodiments and examples described herein. The UE 700 can be a general purpose computer in some embodiments, and can be a device including specially designed circuits to implement various functions, components, or processes described herein in other embodiments. The UE 700 can include processing circuitry 710, a memory 720, a radio frequency (RF) module 730, and an antenna 740.

In various examples, the processing circuitry 710 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 710 can be a central processing unit (CPU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory can include transitory or non-transitory storage medium. The memory 720 can include a read only memory (ROM), a random access memory (RAM), a flash memory, a solid state memory, a hard disk drive, an optical disk drive, and the like.

The RF module 730 receives processed data signal from the processing circuitry 710 and transmits the signal in a beam-formed wireless communication network via an antenna 740, or vice versa. The RF module 730 can include a digital to analog convertor (DAC), an analog to digital converter (ADC), a frequency up converter, a frequency down converter, filters, and amplifiers for reception and transmission operations. The RF module 730 can include multi-antenna circuitry (e.g., analog signal phase/amplitude control units) for beamforming operations. The antenna 740 can include one or more antenna arrays.

The UE 700 can optionally include other components, such as input and output devices, additional or signal processing circuitry, and the like. Accordingly, the UE 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method for wireless communication, comprising:
generating, by a first mobile device, data to be transmitted to a second mobile device via a first radio link without passing through a base station, the first radio link having a first direction from the first mobile device to the second mobile device;
determining, at the first mobile device, a first monitoring configuration associated with the first radio link in the first direction from the first mobile device to the second mobile device;
transmitting, by the first mobile device, the data to the second mobile device via the first radio link in the first direction from the first mobile device to the second mobile device, the first radio link being monitored based on the first monitoring configuration;
detecting, by the first mobile device, feedback signals in response to the transmission of the data; and
comparing, by the first mobile device, a number of expected feedback signals with a number of detected feedback signals based on the first monitoring configuration.

2. The method of claim 1, further comprising:
transmitting, from the first mobile device to the second mobile device, a first message that carries the first monitoring configuration to cause the second mobile device to monitor the first radio link.

3. The method of claim 2, further comprising:
receiving, by the first mobile device, a second message that carries a second monitoring configuration associated with a second radio link in a second direction from the second mobile device to the first mobile device; and
monitoring, by the first mobile device, the second radio link based on the second monitoring configuration.

4. The method of claim 3, wherein the first message and the second message are messages of a sidelink radio resource control (RRC) protocol.

5. The method of claim 3, wherein monitoring the second radio link based on the second monitoring configuration further comprises:
evaluating a reception of a control channel in the second radio link.

6. The method of claim 1, wherein the first monitoring configuration includes at least one of a configuration of reference signals, one or more timer values and one or more threshold values.

7. The method of claim 1, further comprising:
entering, at the first mobile device, a discontinuous transmission (DTX) mode; and
sending, to the second mobile device, an indicator to suspend the first monitoring configuration associated with the first radio link.

8. The method of claim 1, further comprising:
declaring, by the first mobile device, a radio link failure of the first radio link when a ratio of the number of detected feedback signals to the number of expected feedback signals is below a threshold.

9. The method of claim 1, wherein the detecting feedback signals comprises at least one of:
detecting, by the first mobile device, an acknowledgement signal in response to the transmission of the data, the acknowledgement signal indicating a decoding success of the data; and
detecting, by the first mobile device, a negative acknowledgement signal in response to the transmission of the data, the negative acknowledgement signal indicating a decoding failure of the data.

10. An apparatus for wireless communication, comprising:
transmitting circuitry configured to transmit radio signals;
receiving circuitry configured to receive radio signals; and
processing circuitry configured to:
generate data to be transmitted to another apparatus via a first radio link without passing through a base station, the first radio link having a first direction from the apparatus to the other apparatus;
determine a first monitoring configuration associated with the first radio link in the first direction;
transmit, via the transmitting circuitry, the data to the other apparatus via the first radio link in the first direction with the first radio link being monitored based on the first monitoring configuration;
detect feedback signals in response to the transmission of the data; and compare a number of expected feedback signals with a number of detected feedback signals based on the first monitoring configuration.

11. The apparatus of claim 10, wherein the first monitoring configuration includes at least one of a configuration of reference signals, one or more timer values and one or more threshold values.

12. The apparatus of claim 10, wherein the processing circuitry is configured to:
transmit, via the transmitting circuitry, a first message that carries the first monitoring configuration to cause the other apparatus to monitor the first radio link.

13. The apparatus of claim 12, wherein the processing circuitry is configured to:
receive, via the receiving circuitry, a second message that carries a second monitoring configuration associated with a second radio link in a second direction from the other apparatus to the apparatus; and
monitor the second radio link based on the second monitoring configuration.

14. The apparatus of claim 13, wherein the first message and the second message are messages of a sidelink radio resource control (RRC) protocol.

15. The apparatus of claim 13, wherein the processing circuitry is configured to:
evaluate a reception of a control channel in the second radio link based on the second monitoring configuration.

16. The apparatus of claim 10, wherein the processing circuitry is configured to:
cause the apparatus to enter a discontinuous transmission (DTX) mode; and
send, via the transmitting circuitry, an indicator to suspend the first monitoring configuration associated with the first radio link.

17. The apparatus of claim 10, wherein the processing circuitry is configured to:
detect at least one of an acknowledgement signal and a negative acknowledgement signal in response to the transmission of the data, the acknowledgement signal indicating a decoding success of the data, the negative acknowledgement signal indicating a decoding failure of the data.

18. The apparatus of claim 10, wherein the processing circuitry is configured to:
declare a radio link failure of the first radio link when a ratio of the number of detected feedback signals to the number of expected feedback signals is below a threshold.

* * * * *